United States Patent [19]

Schuber

[11] 4,148,853
[45] Apr. 10, 1979

[54] PROCESS FOR THE MANUFACTURE OF A CAPACITOR DIELECTRIC WITH INNER BLOCKING LAYERS

[75] Inventor: Helmuth Schuber, Deutschlandsberg, Austria

[73] Assignee: Siemens Aktiengesellschaft, Berlin & Munich, Fed. Rep. of Germany

[21] Appl. No.: 830,045

[22] Filed: Sep. 2, 1977

[30] Foreign Application Priority Data

Sep. 16, 1976 [DE] Fed. Rep. of Germany ....... 2641701

[51] Int. Cl.² ............................................. H01B 3/12
[52] U.S. Cl. ..................................... 264/37; 252/63.2; 252/62.3 BT; 264/61; 264/66; 264/67; 264/DIG. 69
[58] Field of Search ........... 264/61, 67, 104, DIG. 69, 264/86, 37, 115; 252/63.2, 62.3 BT

[56] References Cited

U.S. PATENT DOCUMENTS

| 3,569,802 | 3/1971 | Brower | 317/238 |
| 4,054,532 | 10/1977 | Hanke et al. | 252/63 |

FOREIGN PATENT DOCUMENTS 1614605 6/1974 Fed. Rep. of Germany.

1204436 9/1970 United Kingdom.

OTHER PUBLICATIONS

Singer, *Industrial Ceramics,* pp. 90–93, 96–100, 741, 90, 1969.
Heywang, "Resistivity Anomaly in Doped Barium Titanate," *J. Am. Cer. Soc.,* vol. 47, No. 10, Oct. 1964, pp. 484–490.
Saburi, "Properties of Semiconductive Barium Titanates," *J. Phys. Soc. Japan,* vol. 14, No. 9, Sep. 1959, pp. 1159–1174.

Primary Examiner—Robert F. White
Assistant Examiner—John A. Parrish
Attorney, Agent, or Firm—Hill, Gross, Simpson, Van Santen, Steadman, Chiara & Simpson

[57] ABSTRACT

For the manufacture of a dielectric with inner blocking layers on the basis of barium titanate smooth fragments, that is a finely ground material after sintering whose composition is equal to or approximately equal to the composition of titanate powder, is added to the titanate powder, which is then transformed through pre-baking before pressing of the desired solids. The addition of such smooth fragments reduces the tolerance on electrical parameters of the dielectric.

9 Claims, 1 Drawing Figure

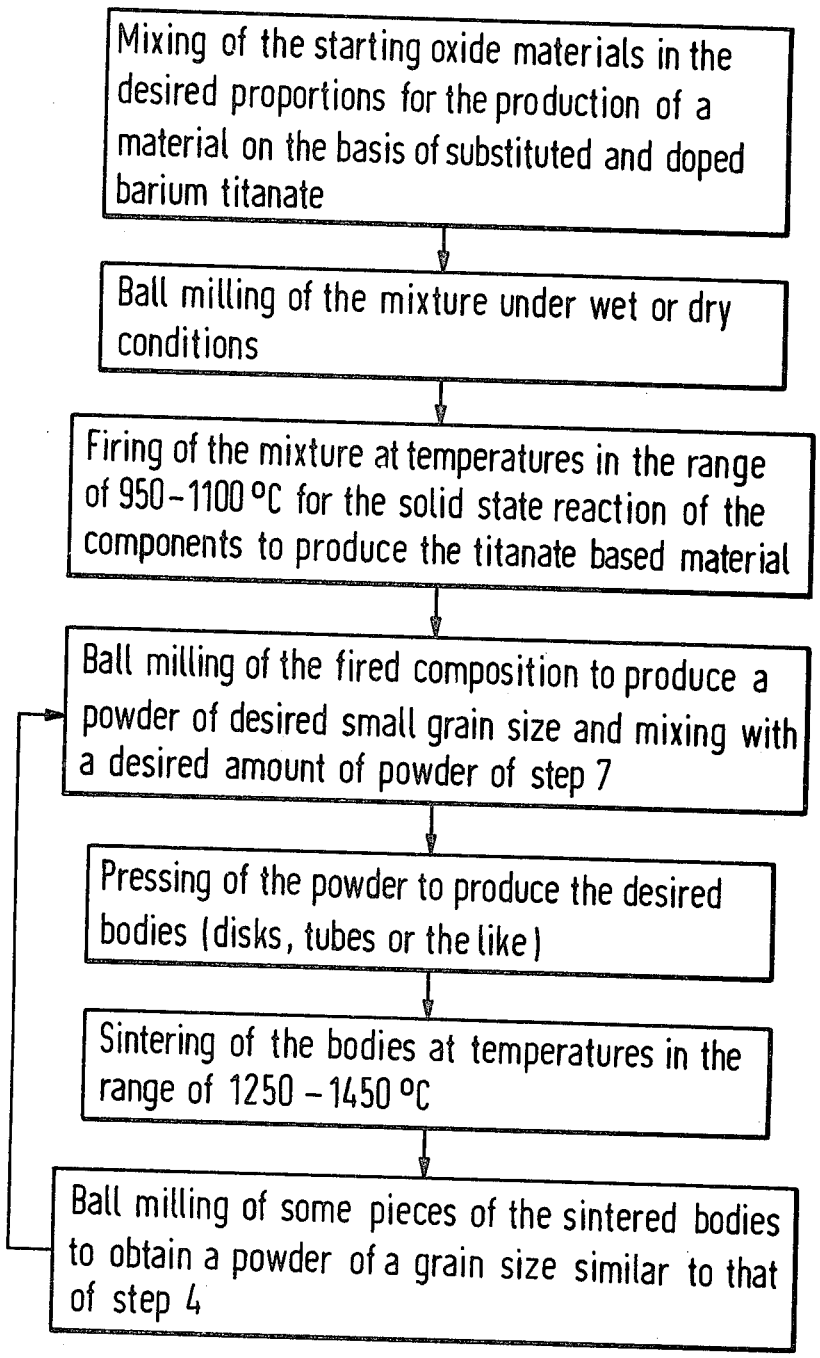

PROCESS FOR THE MANUFACTURE OF A CAPACITOR DIELECTRIC WITH INNER BLOCKING LAYERS

BACKGROUND OF THE INVENTION

The invention concerns a process for manufacturing a capacitor dielectric with inner blocking layers made of polycrystalline ceramic solids of a material with a perovskite structure on the basis of barium titanate of the general formula $$(Ba_{1-x}M_x^{II}) O \cdot z(Ti_{1-y}M_y^{IV})O_3$$

with $M^{II}$=Ca, Sr, Pb and/or Mg and $M^{IV}$=Zr, Sn, whereby z encompasses the values from 1.005 to 1.05. The dielectric contains at least two different doping substances, of which one (Antimony, Niobium, Lanthanum or Bismuth) causes in the interior of the crystallite predominantly n-type conductivity and the other (Copper, Iron, Cobalt, or Manganese) causes in the surface layer of the crystallite predominantly p-type conductivity. The proportion of the doping substance which causes the n-type conductivity is larger by a factor of 1.5 to 2.5 than the maximum doping amount. The proportion of the substance which causes the p-type doping amounts to 0.01 to 0.15 percentage by weight.

In the process, the components which are necessary for the manufacture of the bodies are mixed in oxide form or in a form which produces oxides, are ground wet or dry, and are afterwards brought up to solid state reaction at temperatures between 950° C. to 1100° C., after which the product of the reaction is ground again until the desired particle size is reached. The solids are produced out of the powder by means of pressing and are then subjected to sintering at 1250° C. to 1450° C. for 1 to 6 hours.

Such a process for the manufacture of this capacitor dielectric is described in German Auslegesschrift No. 1,614,605 or in corresponding British patent GB-PS No. 1,204,436 or U.S. Pat. No. 3,569,802.

One capacitor dielectric which is cited in these documents has been on the market for several years under the name SIBATIT 50,000 (SIBATIT is a registered trademark) and has been technologically tested many times. This capacitor dielectric can be used in the form of disks, tubes with circular and with square-shaped cross sections, whereby the common metal layers (e.g., silver) are always used as coatings. The dielectric can also be used in the form of so-called stacking capacitors. Stacking capacitors are the type whose thin layers of dielectric material are arranged one on top of the other with metal layers which protrude to the edge of various sides in alternating fashion. The metal layers are subjected to sintering in this stacked arrangement.

In order to cause maximum conductivity in the interior of the granule with the simultaneous presence of the p-doping substance, despite the proportions of n-doping substance which are higher than those which are normally necessary for the maximum conductivity (maximal doping), the cited documents suggest bringing all the substances together to a reaction in oxide form. In this case the conductivity in the interior of the crystalline granules reaches the highest possible values, whereas the doping substance, in particular copper, which either cannot be incorporated or incorporated only to a limited extent into the perovskite grid, is incorporated essentially into the surface layer of the crystalite.

According to the known process a powder is produced therewith after the solid state reaction of the starting materials. The dielectric solids are immediately produced out of this powder, e.g., through pressing by means of an extrusion press or by means of a standing press, whereby the pn-transitions in the finished solid, which are formed onto the crystallite granules in the surface areas, then become dielectrically effective when voltage is applied.

When one refers to values for the dielectrically constant (DK) in the case of a capacitor dielectric with interior blocking layers, then the apparent DK values are always referred to since in establishing the DK from the measurement of the capacity of such a capacitor it is assumed that the total solid has a high $\epsilon$, whereas in fact only the very thin pn-transitions become dielectrically effective at the granular granule boundaries. These exhibit the usual DK value for barium titanate. However, due to the relation of the total solid, the dielectric has a DK which is raised by many times, for example 30,000 to 100,000, whereas $BaTiO_3$ itself has only DK values of 1000 to 3000 normally.

In a capacitor dielectric not only does the DK play a role in view of the size of the capacity, but it is also necessary that the dependence of the DK on an operating temperature, the tangent of the loss angle (loss factor), and the insulation and thereby the capacitance of the capacitor are located within certain boundaries in the case of higher field intensities.

This is already the case to a large extent for the electrical properties which have been listed here with respect to the capacitor dielectric which was cited above and which has interior blocking layers.

Despite that, it is desirable to bring closer together the limits of tolerance which in part lie relatively far apart, i.e., to make the tolerances of the electrical values which are determined by manufacture smaller and thereby to achieve each time in mass production even more precisely the reproducibility of the desired electrical values. Limits which are too broad for the electrical values occur especially when rutile in the form of $TiO_2$ components is used for the production of perovskite forming materials. This results because then, on the one hand, the DK values are relatively high (up to 100,000) and, on the other hand, the variance of these DK values from capacitor to capacitor is relatively great for the same baking charge with differing sintering conditions (e.g., different sinter ovens).

SUMMARY OF THE INVENTION

It is an object of the present invention to improve the reproducibility of the electrical values, especially in the case of perovskite material with rutile as the initial substance, but also in the use of anatas in the form of $TiO_2$ components.

For the solution of this problem according to the invention there is added to the ground reaction product of the solid state reaction a powder composed of sintered material ground to approximately the same particle size, the latter powder having an equal gross composition (smooth fragments) in quantities of 1 to 70% by weight. The two powders are intensively mixed in a wet or dry state whereupon the bodies are compressed from the powder mixture and subjected to the sintering process.

The smooth fragment proportion is advantageously 8 to 50% by weight.

BRIEF DESCRIPTION OF THE DRAWINGS

The drawing illustrates a flow chart for the production of a dielectric with inner blocking layers according to the method of this invention.

DESCRIPTION OF THE PREFERRED EMBODIMENTS

The following is a flow chart as illustrated in the drawing for the production of inner blocking layers on the basis of barium titanate according to the improved method of this invention:

(1) Mixing of the starting oxide materials in the desired proportions for the production of a material on the basis of substituted and doped barium titanate.

(2) Ball milling of the mixture under wet or dry conditions.

(3) Firing of the mixture at temperatures in the range of 950–1100° C. for the solid state reaction of the components to produce the titanate based material.

(4) Ball milling of the fired composition to produce a powder of desired small grain size and mixing with a desired amount of powder of step 7.

(5) Pressing of the powder to produce the desired bodies (disks, tubes or the like).

(6) Sintering of the bodies at temperatures in the range of 1250° C.–1450° C.

(7) Ball milling of some pieces of the sintered bodies to obtain a powder of a grain size similar to that of step 4.

The process is especially advantageous when a material with the following gross composition is added for the manufacture of the reaction product as well as a smooth fragment supplement:

BaO: 0.6 to 1 mole,
one or several oxides of Ca, Sr, Pb and/or Mg: 0 to 0.4 mole,
$TiO_2$: 0.605 to 1.05 mole,
Oxide of Zr and/or Sn: 0 to 0.4 mole,
$Sb_2O_3$: 0.15 to 0.25% by weight, and
CuO: 0.01 to 0.15% by weight,
whereby the percentages by weight are relative to the total quantity of the perovskite forming materials each time. Rutile is advantageously used as $TiO_2$ components.

The use of smooth fragements (or cullet) in the manufacture of objects out of porcelain for daily use (e.g., dishes) and for technical uses is known per se. The term "smooth fragments" (or cullet) is used for a material which results according to the so-called "glaze firing" in the manufacture of porcelain substances with greater requirements, such substances are baked twice, namely in the so-called "Schruh-firing" according to which the substances are still porous, and thereafter in the "glaze firing" which is carried out, in part, at considerably higher temperatures and in which case a complete vitrification and thereby solidification of the solid takes place.

The previously known use of smooth fragments had on the one hand the function of making material of flawed pieces usable again after the glaze firing, since unusable pieces were sorted out, broken, and ground for reuse in goods which use smooth fragments in processing.

For hard porcelain, especially for electroporcelain (insulators) smooth fragments (in powder form) were introduced before the manufacture of the parts into the powder mixture which was to be pressed in order to reduce the loss due to baking, to increase the tensile strength, and to improve the ability to withstand changes in temperature.

All these applications of the known use of smooth fragments (cullets) are described in the book by Singer, "Industrial Ceramics," Springer-Publishing House (1969) Vol. II on pp. 90 to 93, 96 to 100, and 741. (The English original Edition has the title "Industrial Ceramics" by Felix Singer and Sonja S. Singer, Chapman & Hall Ltd., London 1963).

For the manufacture of electrical capacitors with interior blocking layers on the basis of doped barium titanate with perovskite structure, the use of smooth fragments (cullet) was not obvious. This was because the formation of blocking layers (pn transitions) in or at the crystallite granule surface during the solid-state reaction while prebaking and during the sintering of the solids is a process which is intensively disturbed by foreign matter which does not take part in the formation of the blocking layers. In the manufacture of electrical capacitors, according to the present invention, the influence of the loss or reduction through baking does not have an important effect because materials are used which have already been prebaked at higher temperatures (900 through 1100° C.) anyway. The increasing of the strength, particularly tensile strength, of capacitor solids of the type which are discussed here is not of interest, in any case, because material which possesses perovskite structure on the basis of barium titanate must be sintered at relatively high temperatures. Accordingly, for the purposes which are envisioned for these capacitors, an entirely sufficient strength is present.

The durability under changing temperatures also plays no part in the present case, because what is meant by such durability under changing temperatures is a sudden change of solid temperatures with a significant jump in temperature. In normal operation, this stress of the electrical capacitor does not occur, except in the case of short circuit and of breakdown. In this case, however, the capacitor is destroyed and becomes unusable.

There was therefore no reason to add smooth fragments of the same gross composition to the ground reaction product of the solid state reaction in the production of capacitors with interior blocking layers. It was feared that the formation of the interior blocking layers would be disturbed by the addition of smooth fragments.

Indeed, as experiments have shown in practice, a reduction of DK occurs, which implies that an impairment of the formation of blocking layers results especially in the case of coarser crystalline material (normally the crystallite sizes are located between 20 and 50 $\mu$m) with granular sizes over 100 $\mu$m.

Surprisingly, however, the width of tolerance or the variance of DK from capacitor capacitor for one production charge becomes narrower, and the electrical values such as loss factor, insulating qualities, and temperature coefficient also fluctuate only in very narrow boundaries, i.e., in ranges which have at the most only half of the previous fluctuation range for the individual values and DK.

It should be especially emphasized that through the process of the invention the DK can be brought to a desired value in a simple manner, whereby the insulation resistance is increased. With the increasing proportion of smooth fragments the DK declines, whereas the insulation resistance climbs. Thus, a ceramic body for capacitor dielectric with inner blocking layers which would produce a DK value of the finished solid of approximately 80,000 with an insulating resistance of $2 \cdot 10^3$ megohms without smooth fragments, can product by means of the addition of smooth fragments a DK of approximately 50,000 and an insulation resistance of $2 \cdot 10^4$ megohms, both values having narrower tolerances.

The influence of the addition of smooth fragments is different with different basic compounds and can be determined by means of a simple experimental series for each basic compound.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim as my invention:

1. In a method for the manufacture of a capacitor dielectric with inner blocking layers in which starting components are provided comprising: polycrystalline ceramic solids of materials with perovskite structure on the basis of barium titanate of the general formula

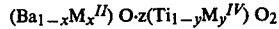

$(Ba_{1-x}M_x^{II})$ $O \cdot z(Ti_{1-y}M_y^{IV})$ $O_2$ with $M^{II}$ selected from the group consisting of Ca, Sr, Pb, Mg and $M^{IV}$ selected from the group consisting of Zr, Sn where z is in a range from 1.005 to 1.05, at least two different doping substances in the dielectric of which one substance selected from the group consisting of antimony, niobium, lanthanum and bismuth is in the interior of the crystallite and causes predominantly n-type conductivity and the other selected from the group consisting of copper, iron, and manganese is in the surface layer of the crystallite and causes predominantly p-type conductivity of which the proportion of the n-type doping substance which causes the n-conductivity is larger by a factor of 1.5 to 2.5 than a maximum of the doping substance, and the proportion of the substance which causes the p-type conductivity amounts to 0.01 to 0.15% by weight;

and wherein said starting components are mixed, ground and thereafter are brought to solid state reaction at 950° C. to 1100° C. to produce a perovskite material, after which a product of the reaction is ground again to desired particle size and solid dielectric bodies of desired shape are produced from the powder by pressing;

and wherein the bodies are then subjected to sintering at 1250° C. to 1450° C. for one to six hours;

wherein the improvement comprises adding a powder ground out of sintered material of the same gross composition as said dielectric bodies in quantities of 1 to 70% by weight to the ground product of said solid state reaction in approximately the same particle size;

intensively mixing the ground powder; and then performing said steps of producing the solid dielectric bodies of desired shape by pressing and sintering at 1250° C. to 1450° C.

2. A method as claimed in claim 1 in which the proportion of said ground powder of the same gross composition amounts to 8 to 50% by weight.

3. A method as claimed in claim 1 in which the material used for the production of a reaction product as well as said ground powder addition of the same gross composition has the following gross composition:
(A) BaO—0.6 to 1 gram molecule;
(B) At least one oxide selected from the group consisting of Ca, Sr, Pb, and Mg—0 to 0.4 gram molecules;
(C) $TiO_2$—0.605 to 1.05 gram molecule;
(D) At least one oxide selected from the group consisting of Zr and Sn—0 to 0.4 gram molecules;
(E) $Sb_2O_3$—0.15 to 0.25% by weight; and
(F) CuO—0.01 to 0.15% by weight,
the percentages by weight being referenced to a total amount of the perovskite forming material.

4. The method of claim 1 in which said starting components are mixed in the form of oxides prior to the grinding.

5. The method of claim 1 in which the starting components are mixed in the form of oxide yielding materials prior to the grinding.

6. The method of claim 1 in which the grinding of the starting components is a wet grinding.

7. The method of claim 1 in which the griding of the starting components is a dry grinding.

8. The method of claim 1 in which the ground powder which is intensively mixed is wet.

9. The method of claim 1 in which the ground powder which is intensively mixed is dry.

* * * * *